(12) United States Patent
Simms et al.

(10) Patent No.: US 10,873,270 B2
(45) Date of Patent: Dec. 22, 2020

(54) CONVERTER APPARATUS USING SOURCE-ACTIVATED DISCHARGE CIRCUITS

(71) Applicant: Eaton Intelligent Power Limited, Dublin (IE)

(72) Inventors: Stan Rex Simms, Arden, NC (US); John David Maurin, Arden, NC (US); Thomas Arthur Farr, Candler, NC (US)

(73) Assignee: Eaton Intelligent Power Limited

( * ) Notice: Subject to any disclaimer, the term of this patent is extended or adjusted under 35 U.S.C. 154(b) by 24 days.

(21) Appl. No.: 15/467,711

(22) Filed: Mar. 23, 2017

(65) Prior Publication Data

US 2018/0278192 A1    Sep. 27, 2018

(51) Int. Cl.
| | |
|---|---|
| *H02P 29/024* | (2016.01) |
| *H02J 7/34* | (2006.01) |
| *H02M 7/06* | (2006.01) |
| *H02M 1/32* | (2007.01) |

(52) U.S. Cl.
CPC .............. *H02M 7/06* (2013.01); *H02J 7/345* (2013.01); *H02P 29/027* (2013.01); *H02M 2001/322* (2013.01)

(58) Field of Classification Search
CPC ........ H02P 29/027; H02J 7/345; H02H 3/027; H02H 1/04; H02H 9/002
See application file for complete search history.

(56) References Cited

U.S. PATENT DOCUMENTS

| | | | |
|---|---|---|---|
| 6,377,478 B1 * | 4/2002 | Morishita | H02P 23/06 363/34 |
| 7,931,128 B2 * | 4/2011 | Sakai | B66B 1/285 187/250 |
| 7,965,529 B2 | 6/2011 | Gibbs et al. | |
| 8,436,590 B2 | 5/2013 | Funaba et al. | |
| 8,541,987 B2 | 9/2013 | Disney et al. | |
| 9,041,327 B2 * | 5/2015 | Breitzmann | H02P 3/22 318/400.22 |

(Continued)

OTHER PUBLICATIONS

Texas Instrument, UCC2817, UCC2818, UCC3817 and UCC3818 BiCMOS Power Factor Pregulator, 2015, pp. 1-13 (Year: 2015).*

(Continued)

*Primary Examiner* — Bickey Dhakal
(74) *Attorney, Agent, or Firm* — Stanek Lemon Crouse & Meeks, P.A.

(57) ABSTRACT

An apparatus, such as a variable frequency drive (VFD), includes a rectifier, a DC bus coupled to an output of the rectifier and at least one capacitor coupled to the DC bus. The apparatus further includes a normally-conducting switch coupled to the DC bus and configured to discharge the at least one capacitor in a conducting state and a control circuit configured to control the normally-conducting switch responsive to an input to the rectifier. The control circuit may be configured to control the normally-conducting switch responsive to a voltage at the input of the rectifier. The control circuit may include a regulator circuit having an input coupled to the input of the rectifier and a driver circuit coupled to an output of the regulator circuit and configured to drive a control terminal of the normally-conducting switch.

14 Claims, 7 Drawing Sheets

(56) References Cited

U.S. PATENT DOCUMENTS

| | | | | |
|---|---|---|---|---|
| 2006/0132105 A1* | 6/2006 | Prasad | ............... | H02M 1/4225 |
| | | | | 323/222 |
| 2012/0235597 A1* | 9/2012 | Nerone | ................. | H05B 45/00 |
| | | | | 315/297 |
| 2014/0307490 A1* | 10/2014 | Sagona | ............... | H02H 7/1252 |
| | | | | 363/44 |
| 2014/0368143 A1* | 12/2014 | Breitzmann | ............. | H02P 3/22 |
| | | | | 318/400.22 |
| 2015/0236606 A1* | 8/2015 | Sakakibara | ......... | H02M 5/4585 |
| | | | | 363/37 |
| 2018/0183348 A1* | 6/2018 | Hu | ......................... | H02M 5/42 |

OTHER PUBLICATIONS

Bendel et al., "Using 'Normally on' JFETs in Power Systems," Bodo's Power Systems®, Mar. 2015, pp. 40 and 43.

ISO5125I Preliminary Data Sheet, *High-Voltage Insulated DC/DC Power Supply for SCALE-2 Gate Drivers for 3.3kV, 4.5V and 6.5kV IGBT Modules*; CT-Concept Technologigie AG—Switzerland, Jul. 29, 2011, pp. 1-9.

Jaino Parasseril; *How to Produce Negative Output Voltages from Positive Inputs using a uModule Step-Down Regulator*, Linear Technology Corporation, (2011), 4 pages.

36V, 3A Step-Down uModule Regulator, Linear Technology Corporation (2009); pp. 1-22.

\* cited by examiner

CONVERTER APPARATUS USING SOURCE-ACTIVATED DISCHARGE CIRCUITS

BACKGROUND

The inventive subject matter relates to electrical converter apparatus and, more particularly, to capacitor discharge circuits for motor drives and other converter apparatus.

Variable frequency drives (VFDs) are commonly used with large industrial electric motors. A VFD can be used to gradually start a motor, reducing inrush current by accelerating the motor in a controlled fashion. They are commonly used in mining, resource extraction and other applications to drive compressors, pumps and conveyors.

Figure 1:
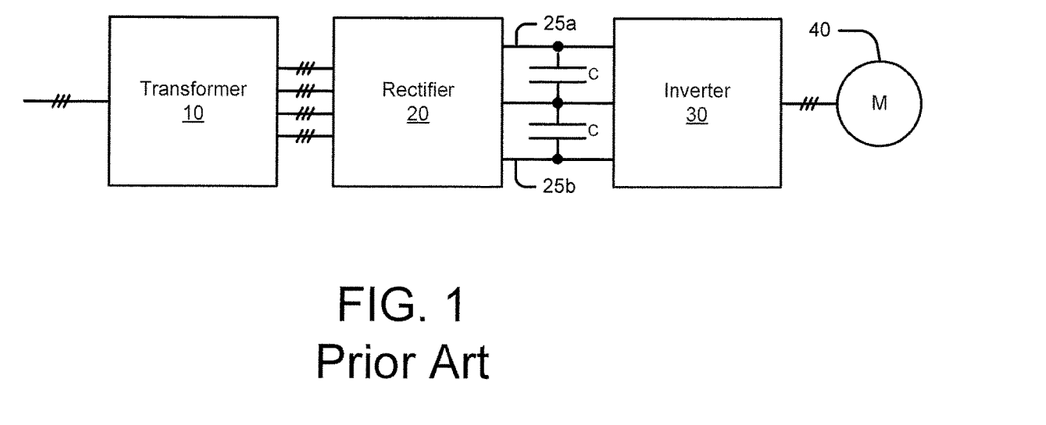
FIG. 1 is a schematic diagram illustrating a conventional variable frequency drive (VFD).

FIG. 1 illustrates a typical conventional VFD architecture. A transformer 10 has a primary configured to be coupled to a three-phase AC source, and multiple secondary windings that feed a 24-pulse rectifier 20. The rectifier 20 provides DC power to DC buses 25a, 25b, which couple the rectifier 20 to an inverter 30. The inverter 30 provides a variable-frequency AC output to a motor 40 (e.g., a squirrel-cage induction motor).

The VFD typically includes storage capacitors C that are coupled to the DC buses 25a, 25b and provide transient energy storage to maintain voltages on the buses 25a, 25b. In medium-voltage (e.g., 2.5 to 15 kV) drives, these capacitors may store large amounts of energy, and may present safety problems if not properly discharged before maintenance and other operations.

SUMMARY

Some embodiments of the inventive subject matter provide an apparatus including a rectifier, a DC bus coupled to an output of the rectifier and at least one capacitor coupled to the DC bus. The apparatus further includes a normally-conducting switch coupled to the DC bus and configured to discharge the at least one capacitor in a conducting state and a control circuit configured to control the normally-conducting switch responsive to an input to the rectifier. The control circuit may be configured to control the normally-conducting switch responsive to a voltage at the input of the rectifier. In some embodiments, the control circuit may include a regulator circuit having an input coupled to the input of the rectifier and a driver circuit coupled to an output of the regulator circuit and configured to drive a control terminal of the normally-conducting switch.

In further embodiments, the normally-conducting switch may include at least one depletion-mode FET. The at least one depletion-mode FET may include at least one n-channel depletion-mode FET and the driver circuit may include an inverting DC-DC converter having an input coupled to the regulator circuit and an output coupled to a control terminal of the at least one n-channel depletion-mode FET. In some embodiments, the normally-conducting switch may include a normally-on supercascode switch including at least one depletion-mode FET.

In further embodiments, the control circuit may be configured to control the normally-conducting switch responsive to a voltage on the DC bus.

Still further embodiments provide a motor drive including a rectifier having an input configured to be coupled to an AC power source, a DC bus coupled to an output of the rectifier, an inverter having an input coupled to the DC bus and an output configured to be coupled to a motor, and at least one capacitor coupled to the DC bus. The motor drive further includes a normally-conducting switch and a resistor serially coupled to the DC bus and a control circuit coupled to the input of the rectifier and configured to control the normally-conducting switch responsive to a voltage at the input of the rectifier.

In still further embodiments, an apparatus includes a normally-conducting switch and a resistor configured to be serially coupled to a DC bus of a motor drive and a control circuit configured to control the normally-conducting switch responsive to a voltage at an input of a rectifier coupled to the DC bus.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
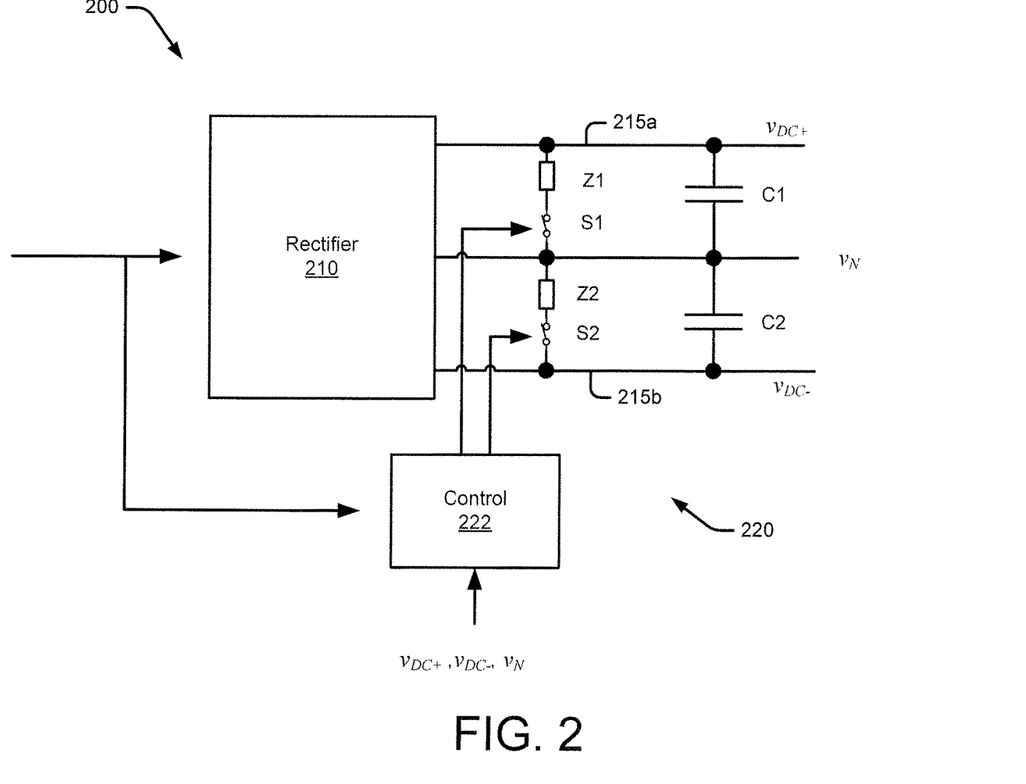
FIG. 2 is a schematic diagram illustrating a DC bus discharge circuit according to some embodiments of the inventive subject matter.

FIG. 2 illustrates an apparatus 200 according to some embodiments of the inventive subject matter. The apparatus 200 includes a rectifier 210, which is configured to produce DC voltages $V_{DC+}$, $V_{DC-}$ on buses 215a, 215b. Storage capacitors C1, C2 are coupled to the DC buses 215a, 215b. The apparatus 200 may be included, for example, in a variable-frequency drive (VFD) or other converter apparatus, such as an uninterruptible power supply (UPS), which includes capacitors or other components that store charge that can present potential danger of personnel injury and/or component damage.

As shown, the apparatus 200 further includes a discharge circuit 220 which is configured to selectively discharge the bus capacitors C1, C2 responsive to an input to the rectifier 210. More particularly, the discharge circuit 220 includes normally-conducting (e.g., normally-closed or normally-on) switches S1, S2 which are coupled in series with impedances Z1, Z2 to the respective buses 215a, 215b. The switches S1, S2 may be, for example, semiconductor switches (e.g., transistors) or electromechanical switches. A control circuit 222 controls the switches S1, S2 responsive to an input to the rectifier 210. The input to the rectifier 210 may be, for example, a voltage applied to the rectifier 210 by an AC source, such as a transformer along the lines of the transformer 10 of FIG. 1. The control circuit 222 is configured to maintain the switches S1, S2 in an "on" or "closed" conducting state for a first state of the input to the rectifier 210, thus enabling the bus capacitors C1, C2 to be discharged via the impedances Z1, Z2. The first state of the input to the rectifier 210 may be, for example, a voltage at an input of the rectifier 210 exceeding a predetermined level. The control circuit 220 is further configured to transition the switches S1, S2 to an non-conducting "off" or "open" state responsive to a second state of the input to the rectifier 210, thus preventing discharge through the impedances Z1, Z2. The second state of the input to the rectifier 210 may be, for example, the voltage at the input of the rectifier 210 falling below a predetermined level. Thus, for example, when power is being transferred at the input of the rectifier 210, the switches S1, S2 may be placed in a non-conducting state to prevent current flow through the impedances Z1, Z2 and, when no power is being transferred at the input of the rectifier 210, the switches Z1, Z2 may be placed in a conducting state to enable discharge of the bus capacitors C1, C2.

Figure 3:
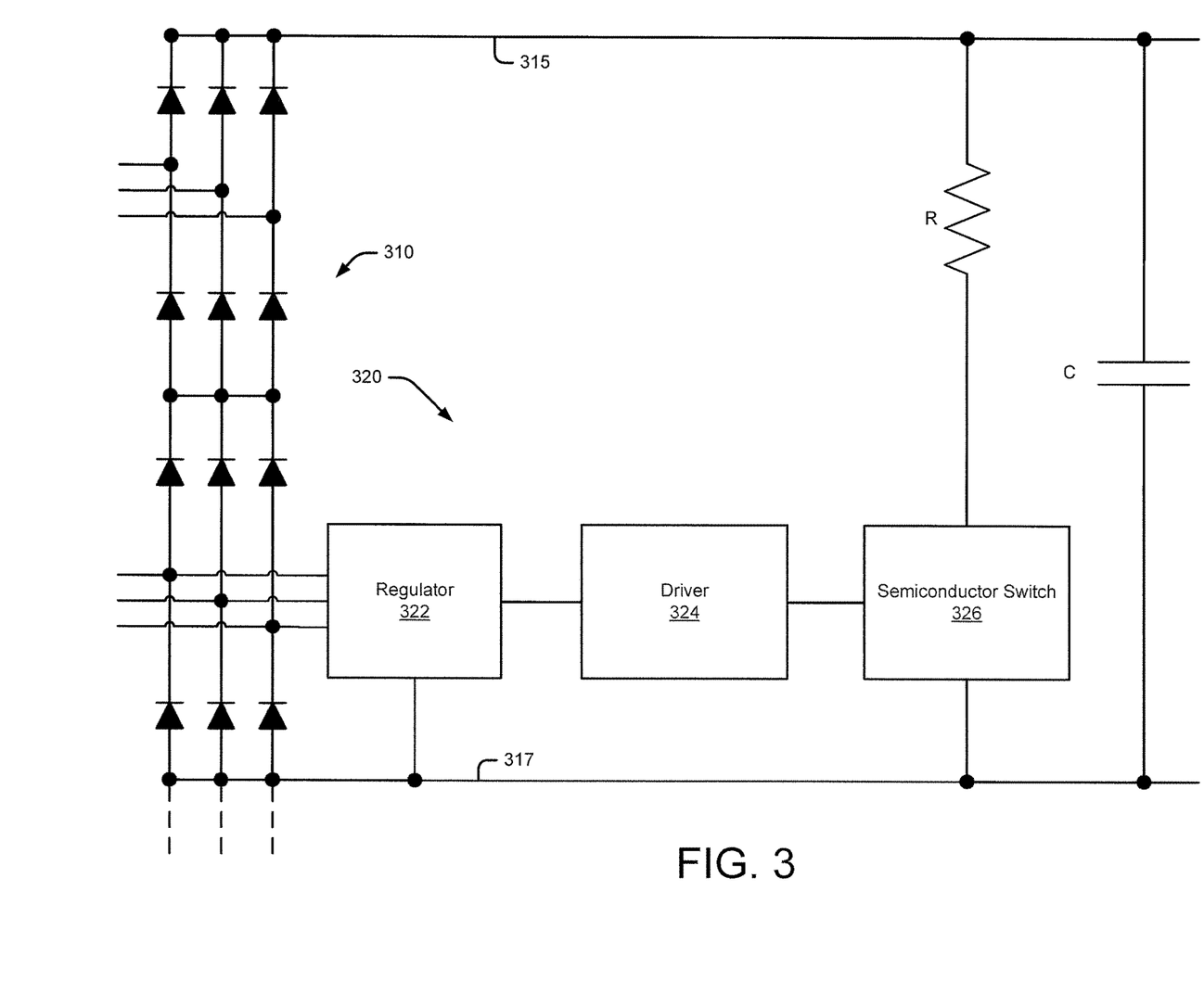
FIG. 3 is a schematic diagram illustrating a DC bus discharge circuit for a VFD according to further embodiments.

FIG. 3 illustrates implementation of such a discharge circuit in a power train of a VFD according to further embodiments. A rectifier 310 (e.g., a 12-pulse rectifier) includes an input configured to be coupled to and AC source and an output coupled to DC buses 315, 317 (e.g., a positive bus and a neutral bus, respectively). A discharge circuit 320 includes a regulator circuit 322 having an input coupled to the first rectifier 310. The output of the regulator circuit 322 is coupled to driver circuit 324 that drives a normally-on semiconductor switch 326, which is used to conduct discharge current from a storage capacitor C coupled to the DC bus 315 via a bleeder resistor R. When a voltage $v_{in}$ applied to the first rectifier 310 is zero, indicating that no power is being applied to the VFD drive train, the driver circuit 324 is inactive and maintains the switch 326 in its "on" state such that the storage capacitor C may be discharged via the bleeder resistor R. When the voltage $v_{in}$ is of sufficient magnitude, the regulator circuit 322 applies a DC voltage to the driver circuit 324 and, responsive to this DC voltage, the driver circuit 324 drives the switch 326 to an "off" state. This can prevent current flow from the DC bus 315 via the bleeder resistor R when the VFD is driving a motor and, thus, reduce losses while still providing safe discharge of the bus capacitor C for maintenance and other purposes.

Figure 4:
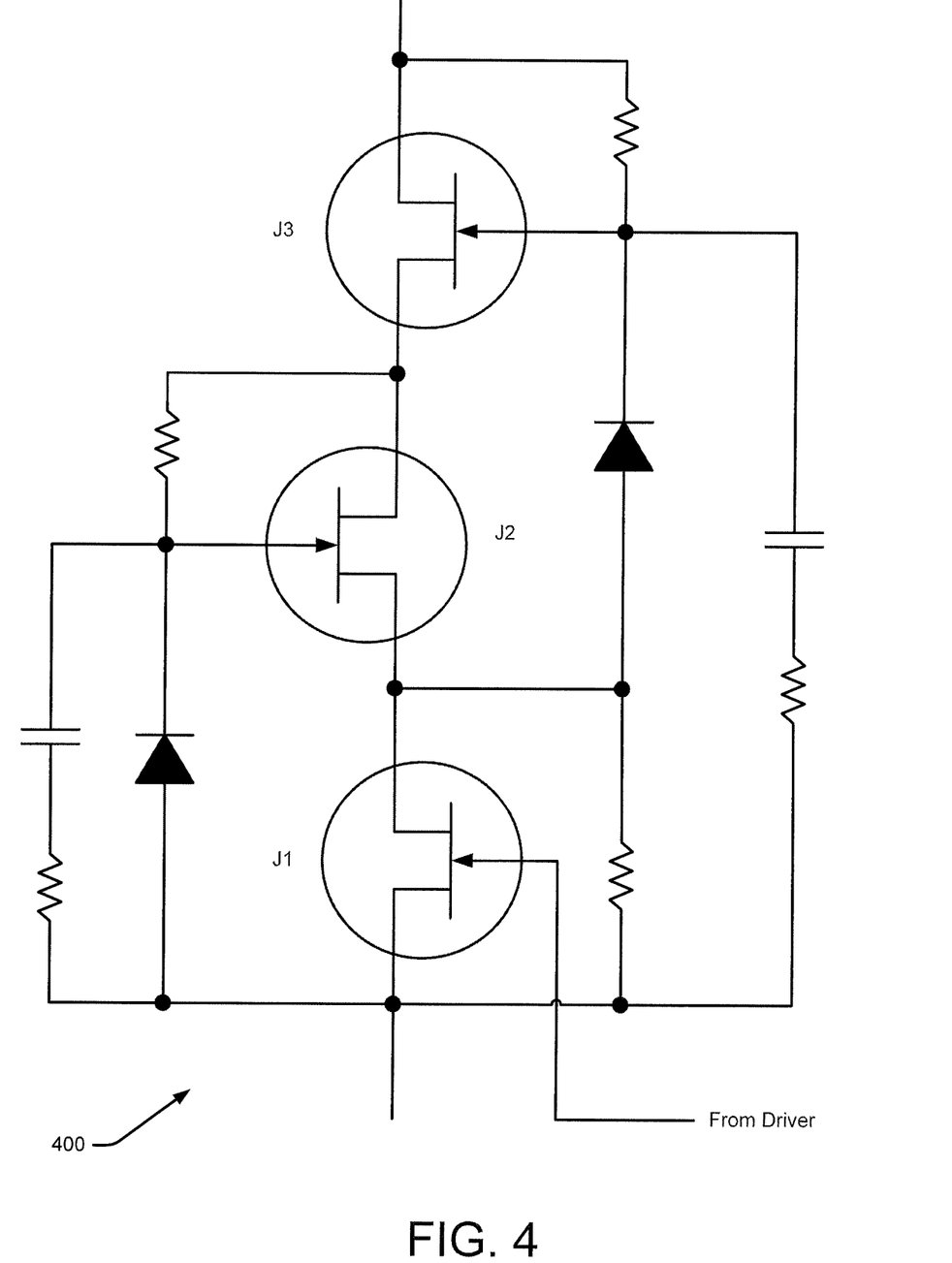
FIG. 4 is a schematic diagram illustrating a depletion-mode supercascode circuit for use in the discharge circuit of FIG. 3.

FIG. 4 illustrates an example of a depletion-mode switch 400 that may be used in the discharge circuit 320 of FIG. 3. The switch 400 is a depletion-mode FET supercascode arrangement including three serially-connected depletion-mode FETs J1, J2, J3 interconnected by a biasing network. The FETs J1, J2, J3 are normally on when an insufficiently negative bias is applied to the gate terminal of the first FET J1, thus allowing current to flow through the FETs J1, J2, J3. When a sufficiently negative voltage is applied to its gate terminal, the first FET J1 turns off, which, in turn, causes the second and third FETs J2, J3 to sequentially turn off. As DC bus voltages in medium voltage VFD applications can be on the order of 3000 volts, a supercascode arrangement such as that shown in FIG. 4 allows for the use of relatively low voltage FETs. It will be appreciated that other switch arrangements, such as single high-voltage depletion-mode FET, may be similarly used.

Figure 5:
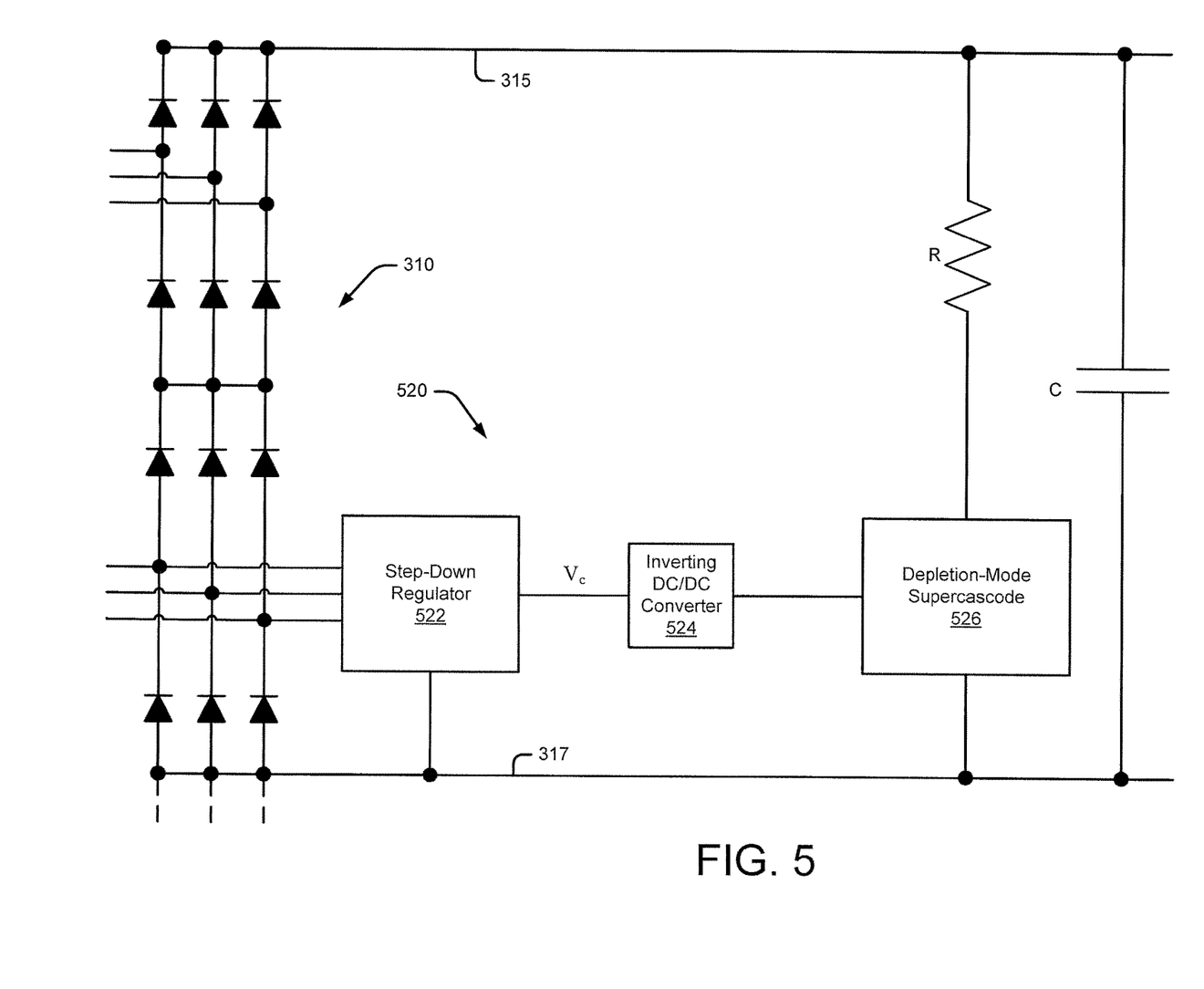
FIG. 5 is a schematic diagram illustrating a DC bus discharge circuit for a VFD according to further embodiments.

FIG. 5 illustrates a discharge circuit for a VFD according to further embodiments. A discharge circuit 520 includes a step-down regulator circuit 522 having an input coupled to a rectifier 310 of the VFD and an output coupled to an inverting DC-DC converter circuit 524. Responsive to a positive DC voltage $V_c$ generated by the step-down regulator circuit 522, the inverting DC-DC converter circuit 524 generates a negative gate voltage to drive a depletion-mode supercascode switch 526, such as the one illustrated in FIG. 4.

The step-down regulator circuit 522 produces a relatively low DC output voltage $V_c$, from a relatively high AC voltage applied to the input of the rectifier circuit 310. In a medium-voltage VFD, for example, the step-down regulator circuit 522 may step down from an around 1500 volts AC applied to the rectifier circuit 310 and produce an output voltage $V_c$ of about 24-32 volts DC. The step-down regulator circuit 522 may include, for example, an isolated turns ratio flyback converter or forward converter.

Figure 6:
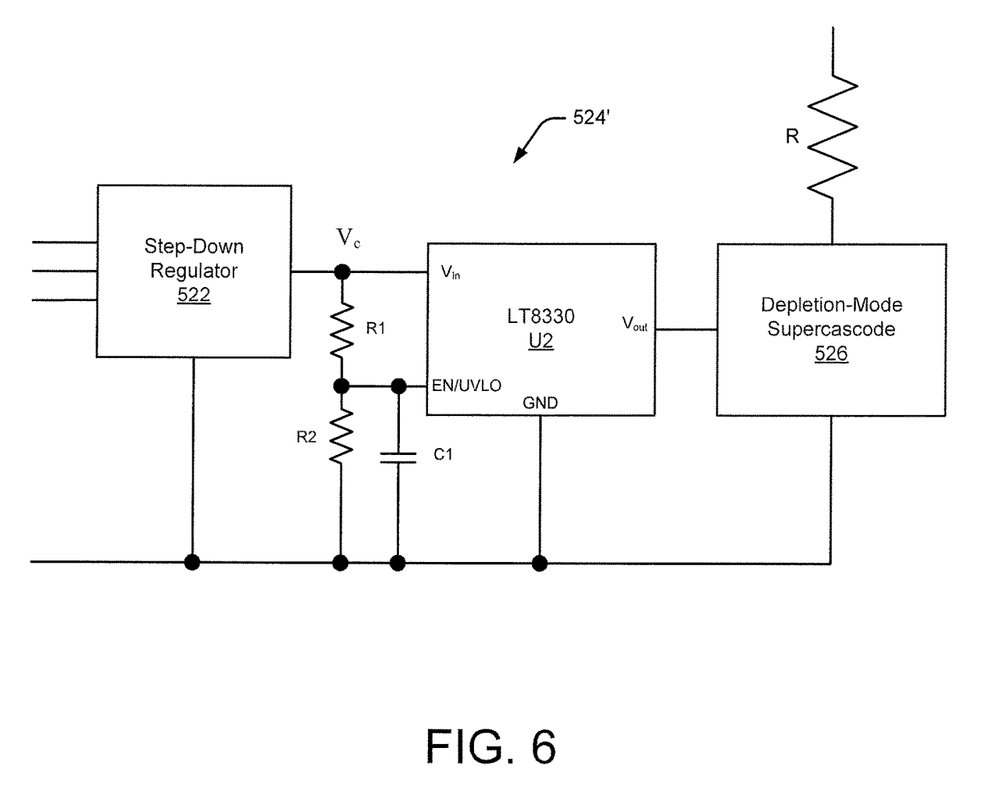
FIG. 6 illustrates control circuitry for the discharge circuit of FIG. 5 according to some embodiments.

FIG. 6 illustrates an exemplary implementation of a discharge circuit according to further embodiments. A DC voltage $V_c$ produced by the step-down regulator circuit 522 is applied to an inverting DC-DC converter circuit 524' is implemented using a Linear Technology LT 8330 Boost/SEPIC Inverting Converter integrated circuit U2 configured in a SEPIC/inverting configuration. The converter chip U2 produces a negative voltage at its output terminal OUT when the step-down regulator circuit 522 produces the positive DC voltage $V_c$. The SEPIC/inverting configuration uses a delay circuit including resistors R1, R2 and capacitor C1 coupled to a shutdown and undervoltage detect pin EN/UVLO, which provides a delay in generation of a negative output voltage upon the rectifier 310 reaching a threshold voltage. The negative output voltage is applied to the depletion-mode supercascode circuit 526. Thus, when a nonzero voltage of sufficient magnitude is applied to the input of the rectifier 310, the converter chip U2 produces a negative voltage sufficient to turn off the supercascode switch 526.

Figure 7:
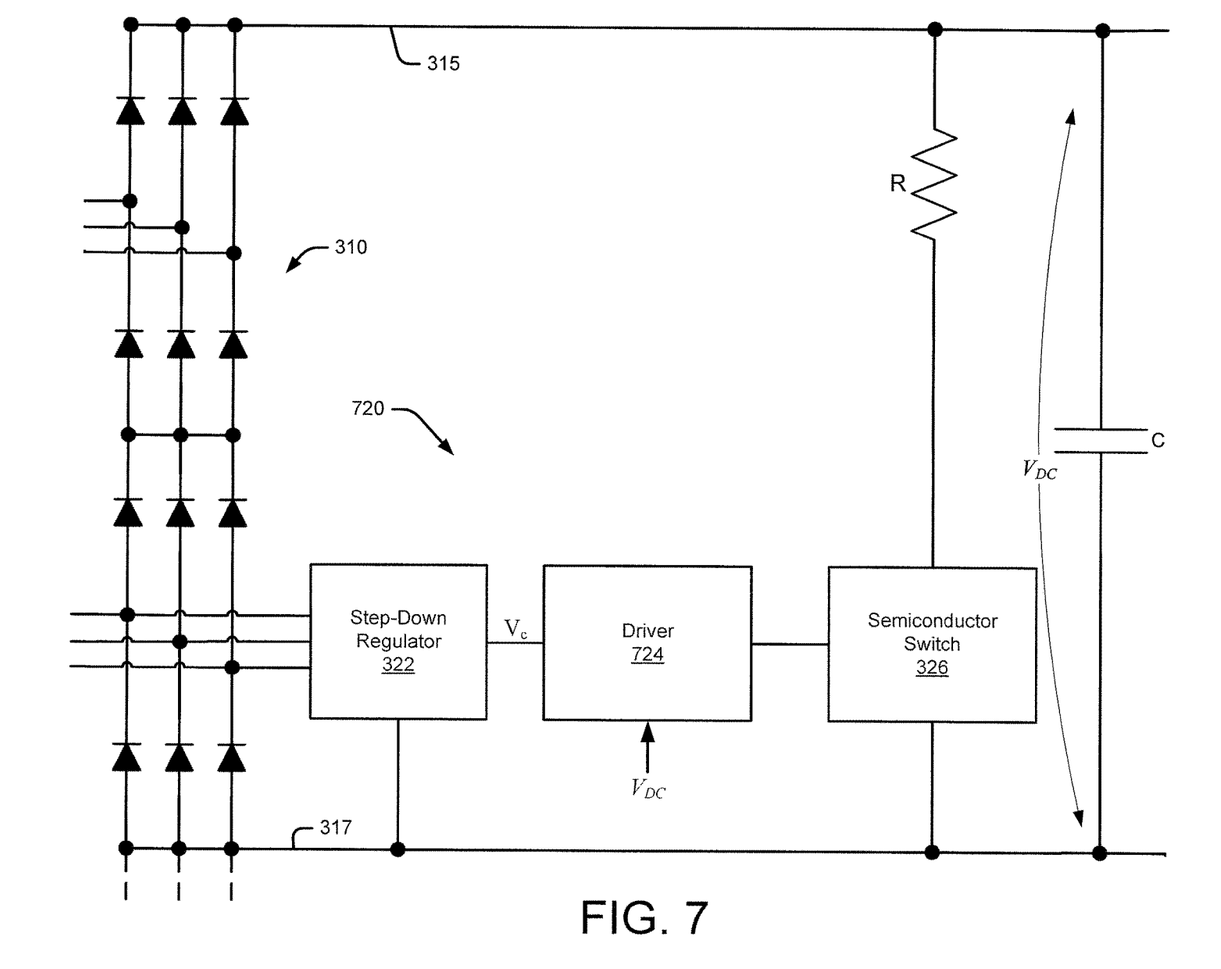
FIG. 7 is a schematic diagram illustrating a DC bus discharge circuit for a VFD according to further embodiments.

According to further embodiments, a discharge circuit along the lines described above may also operate responsive to other inputs than a rectifier input to support other functions. For example, in some embodiments, a discharge circuit may also operate responsive to a control input to provide power dissipation in motor deceleration operations. For example, FIG. 7 illustrates circuitry along lines illustrated in FIG. 3, with the system in FIG. 7 differing from the system of FIG. 3 in that a driver 724 for the normally-on semiconductor switch 326 is further configured to operate responsive to the DC bus voltage $V_{DC}$. When the DC bus voltage $V_{DC}$ meets a predetermined criterion, the normally-on switch 326 can be turned on, even when there is a nonzero voltage at the input of the rectifier 310. For example, when the DC bus voltage $V_{DC}$ exceeds a certain level, the normally-on switch 326 can be turned on and, when the DC bus voltage $V_{DC}$ falls below a certain voltage (e.g., a level equal to or lower than the turn-on threshold), the normally-on switch 326 can again be turned off. Such an arrangement may be of use, for example, when the DC bus voltage $V_{DC}$ increases due to an overhauling or decelerating load, i.e., the normally-on switch 326 can be turned on until deceleration is complete or reaches a certain state. Use of high amperage and higher voltage switches for the normally-open switch 326 and a high-power resistor for the resistor R could enable use of a similar technique to provide a dynamic braking, which may be advantageous in applications involving high inertia loads or loads that require intermittent braking, such as varying conveyor loads. A control input for such braking may be a bus voltage as described above and/or some other input, such as a current sense input or the like.

Figure 8:
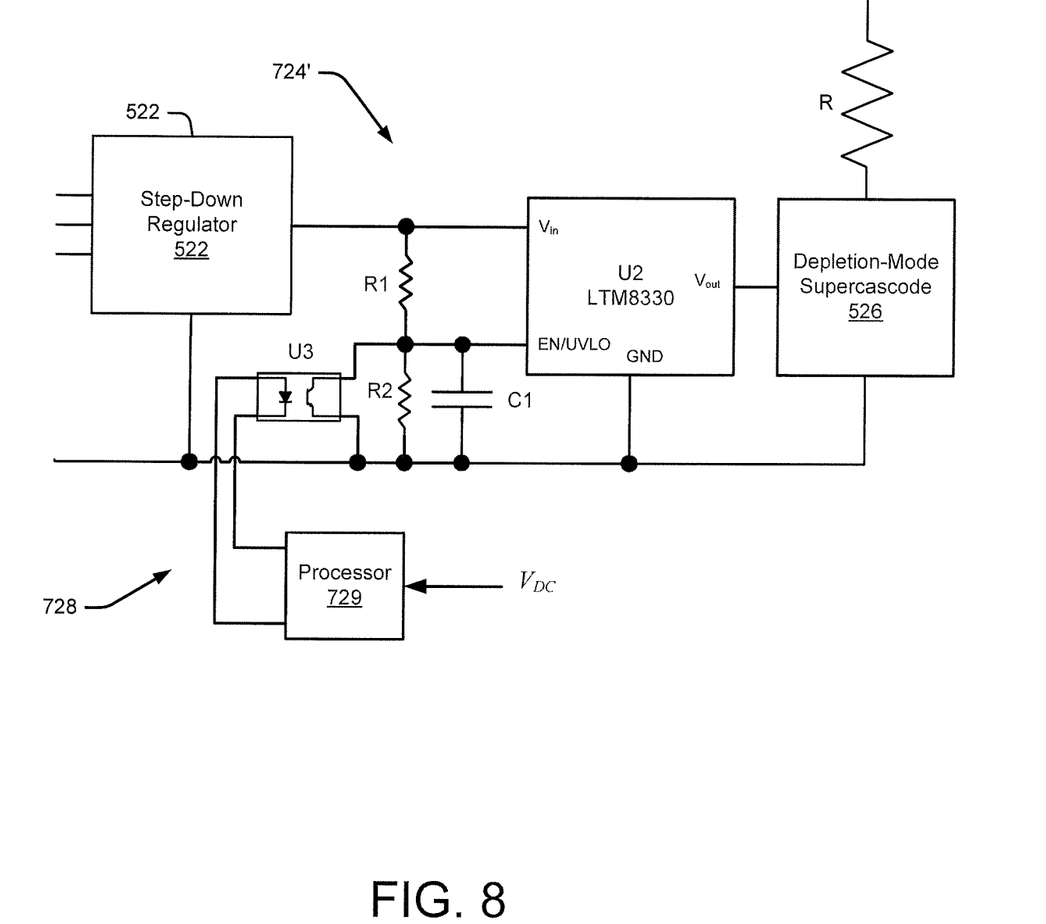
FIG. 8 illustrates control circuitry for the discharge circuit of FIG. 7 according to some embodiments.

FIG. 8 illustrates an exemplary implementation of the apparatus of FIG. 7 using components along the lines of those illustrated in FIG. 6, where like items in FIGS. 6 and 8 are identified by like reference numerals. FIG. 8 differs from FIG. 8 in that a driver circuit 724' includes a control circuit 728 including a processor 729 (e.g., a microcontroller) that is configured to sense the DC voltage $V_{DC}$ and to responsively apply a control signal to a shutdown and undervoltage detect pin EN/UVLO of the converter chip U2 via an interface circuit including an opto-isolator U3. Application of a positive voltage to the shutdown and undervoltage detect pin EN/UVLO of the converter chip U2 causes its output to return to ground, thus allowing the depletion-mode supercascode switch 528 to turn on. The processor 729 may be, for example, a microcontroller that controls an inverter of a VFD incorporating the apparatus of FIG. 8. Such a processor may also assert the control signal to the opto-isolator U3 responsive to other control parameters, such as motor current, speed, acceleration, etc.

It will be appreciated that the implementations shown described above are provided for purposes of illustration, and that other circuit arrangements may be used to provide similar functionality. For example, rather than using the arrangement shown in FIGS. 5, 6 and 8, an isolated DC-DC converter (e.g., a Concept Technologie AG ISO51251) may be used. In further embodiments, a single high-voltage depletion-mode FET may be used instead of a supercascode transistor arrangement as shown in FIGS. 4-8. In some embodiments, a high-side driver implementation may be used wherein a semiconductor switch, such as the switch 326 of FIG. 3, is connected to positive bus 315 and the bleed off resistor is connected to the negative bus. In such an arrangement, a step-down regulator circuit, such as the step-down regulator circuit 322 of FIG. 3, may float at a substantial offset voltage.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:
1. An apparatus comprising:
   a rectifier;
   a DC bus coupled to an output of the rectifier;
   at least one capacitor coupled to the DC bus;
   at least one n-channel depletion-mode FET and a resistor coupled in series to the DC bus; and
   a control circuit configured to cause the at least one n-channel depletion-mode FET to transition from a non-conducting state to a conducting state responsive to a decrease in an AC voltage at an input to the rectifier to thereby discharge the at least one capacitor via the at least one n-channel depletion-mode FET and the resistor, the control circuit comprising:
   a regulator circuit having an input coupled to the input of the rectifier; and
   an inverting DC-DC converter having an input coupled to the regulator circuit and an output coupled to a control terminal of the at least one n-channel depletion-mode FET.

2. The apparatus of claim 1, comprising a supercascode switch including the at least one n-channel depletion-mode FET.

3. The apparatus of claim 1, wherein the control circuit is further configured to control the at least one n-channel depletion-mode FET responsive to a voltage on the DC bus.

4. A motor drive comprising:
   a rectifier having an input configured to be coupled to an AC power source;
   a DC bus coupled to an output of the rectifier;
   an inverter having an input coupled to the DC bus and an output configured to be coupled to a motor;
   at least one capacitor coupled to the DC bus; and
   a normally-on or normally-closed switch and a resistor coupled in series to the DC bus; and
   a control circuit coupled to the input of the rectifier and configured to cause the normally-on or normally-closed switch to transition from a non-conducting state to a conducting state responsive to a decrease in an AC voltage at the input of the rectifier to thereby discharge the at least one capacitor through the normally-on or normally-closed switch and the resistor, the control circuit comprising:
   a regulator circuit having an input coupled to the input of the rectifier; and
   a DC-DC converter circuit coupled to an output of the regulator circuit and configured to drive a control terminal of the normally-on or normally-closed switch.

5. The motor drive of claim 4, wherein the control circuit is configured to place the normally-on or normally-closed switch in the non-conducting state responsive to the voltage at the input of the rectifier meeting a predetermined criterion.

6. The motor drive of claim 4, wherein the normally-on or normally-closed switch comprises at least one depletion-mode FET.

7. The motor drive of claim 6, wherein the at least one depletion-mode FET comprises at least one n-channel depletion-mode FET and wherein the DC-DC converter circuit comprises an inverting DC-DC converter circuit having an input coupled to the regulator circuit and an output coupled to a control terminal of the at least one n-channel depletion-mode FET.

8. The motor drive of claim 6, wherein the normally-on or normally-closed switch comprises a normally-on supercascode switch comprising at least one depletion-mode FET.

9. The motor drive of claim 4, wherein the control circuit is further configured to control the normally-on or normally-closed switch responsive to a voltage on the DC bus.

10. An apparatus comprising:
a normally-on or normally-closed switch and a resistor configured to be coupled in series to a DC bus of a motor drive; and
a control circuit configured to cause the normally-on or normally-closed switch to transition from a non-conducting state to a conducting state responsive to a reduction in an AC voltage at an input of a rectifier coupled to the DC bus to thereby discharge at least one capacitor coupled to the DC bus through the normally-on or normally-closed switch and the resistor; the control circuit comprising:
a regulator circuit having an input coupled to the input of the rectifier; and
a DC-DC converter circuit coupled to an output of the regulator circuit and configured to drive a control terminal of the normally-on or normally-closed switch.

11. The apparatus of claim 10, wherein the control circuit is configured to place the normally-on or normally-closed switch in a non-conducting state responsive to the voltage at the input of the rectifier having a magnitude exceeding a threshold.

12. The apparatus of claim 10, wherein the normally-on or normally-closed switch comprises at least one depletion-mode FET.

13. The apparatus of claim 12, wherein the at least one depletion-mode FET comprises at least one n-channel depletion-mode FET and wherein the DC-DC converter circuit comprises an inverting DC-DC converter.

14. The motor drive of claim 12, wherein the normally-on or normally-closed switch comprises a normally-on supercascode circuit comprising the least one depletion-mode FET.

* * * * *

UNITED STATES PATENT AND TRADEMARK OFFICE
CERTIFICATE OF CORRECTION

PATENT NO. : 10,873,270 B2
APPLICATION NO. : 15/467711
DATED : December 22, 2020
INVENTOR(S) : Simms et al.

Page 1 of 1

It is certified that error appears in the above-identified patent and that said Letters Patent is hereby corrected as shown below:

On the Title Page (73) Assignee: Please correct "Eaton Intelligent Power Limited" to read -- Eaton Intelligent Power Limited (IE) --

Signed and Sealed this
First Day of June, 2021

Drew Hirshfeld
*Performing the Functions and Duties of the*
*Under Secretary of Commerce for Intellectual Property and*
*Director of the United States Patent and Trademark Office*